(12) United States Patent
Saleh et al.

(10) Patent No.: US 7,200,104 B2
(45) Date of Patent: Apr. 3, 2007

(54) METHOD FOR RESTORING A VIRTUAL PATH IN AN OPTICAL NETWORK USING 1+1 PROTECTION

(75) Inventors: Ali Najib Saleh, Ft. Lauderdale, FL (US); H. Michael Zadikian, McKinney, TX (US); Zareh Baghdasarian, La Canada, CA (US); Vahid Parsi, Sherman Oaks, CA (US)

(73) Assignee: Cisco Technology, Inc., San Jose, CA (US)

( * ) Notice: Subject to any disclaimer, the term of this patent is extended or adjusted under 35 U.S.C. 154(b) by 910 days.

(21) Appl. No.: 09/859,166

(22) Filed: May 16, 2001

(65) Prior Publication Data

US 2003/0179700 A1 Sep. 25, 2003

Related U.S. Application Data

(63) Continuation-in-part of application No. 09/858,743, filed on May 16, 2001, which is a continuation-in-part of application No. 09/232,397, filed on Jan. 15, 1999, now Pat. No. 6,856,627.

(51) Int. Cl.
*G06F 11/00* (2006.01)
*H04L 12/28* (2006.01)

(52) U.S. Cl. .................. 370/216; 370/227; 370/250; 370/397

(58) Field of Classification Search ............. 370/216, 370/225, 226, 227, 228, 241, 242, 244, 248, 370/250, 397
See application file for complete search history.

(56) References Cited

U.S. PATENT DOCUMENTS 5,049,871 A    9/1991  Sturgis et al. .............. 370/224
5,093,824 A    3/1992  Coan et al. ................... 370/16
5,412,376 A    5/1995  Chujo et al. ............. 340/825.1
5,590,118 A   12/1996  Nederlof .................... 370/218
5,590,119 A * 12/1996  Moran et al. ............... 370/225
5,596,722 A    1/1997  Rahnema .................... 395/200
5,646,936 A *  7/1997  Shah et al. ................. 370/228
5,687,167 A   11/1997  Bertin et al. ................ 370/254

(Continued)

FOREIGN PATENT DOCUMENTS

EP    0 781 068 A1    6/1997

(Continued)

OTHER PUBLICATIONS

Ali Saleh, H. Michael Zadikian, Zareh Baghdasarian, Vahid Parsi , "A Method For Routing Information Over A Network", filed Jan. 15, 1999, U.S. Appl. No. 09/232,397.

(Continued)

*Primary Examiner*—Afsar Qureshi
(74) *Attorney, Agent, or Firm*—Campbell Stephenson Ascolese LLP

(57) ABSTRACT

A method for restoring a virtual path, provisioned between a source and a target node, in a zoned mesh optical network is described. The method, in one embodiment, allocates a primary and a secondary physical path to the virtual path. The two physical paths are network element and link disjoint. In case of a failure in one physical path, the end nodes switch the virtual path to the other physical path.

79 Claims, 4 Drawing Sheets

U.S. PATENT DOCUMENTS

| | | | |
|---|---|---|---|
| 5,737,319 A | 4/1998 | Croslin et al. | 370/255 |
| 5,781,528 A | 7/1998 | Sato et al. | 370/218 |
| 5,805,578 A | 9/1998 | Stirpe et al. | 370/255 |
| 5,805,593 A | 9/1998 | Busche | 370/396 |
| 5,835,696 A | 11/1998 | Hess | 395/182.08 |
| 5,881,048 A | 3/1999 | Croslin | 370/228 |
| 5,881,246 A | 3/1999 | Crawley et al. | 709/238 |
| 5,884,297 A | 3/1999 | Noven | 707/1 |
| 5,920,257 A | 7/1999 | Commerford | 340/506 |
| 5,933,425 A | 8/1999 | Iwata | 370/351 |
| 5,959,972 A | 9/1999 | Hamami | 370/228 |
| 5,987,526 A | 11/1999 | Morales | 709/249 |
| 5,995,503 A | 11/1999 | Crawley et al. | 370/351 |
| 5,999,286 A | 12/1999 | Venkatesan | 359/117 |
| 6,011,780 A | 1/2000 | Vaman et al. | 370/237 |
| 6,041,037 A | 3/2000 | Nishio et al. | 370/228 |
| 6,041,049 A | 3/2000 | Brady | 370/351 |
| 6,047,331 A | 4/2000 | Medard et al. | 709/239 |
| 6,075,766 A | 6/2000 | Croslin | 370/225 |
| 6,075,775 A | 6/2000 | Ueki | 370/248 |
| 6,097,696 A | 8/2000 | Doverspike | 370/216 |
| 6,097,722 A | 8/2000 | Graham et al. | 370/395 |
| 6,115,753 A | 9/2000 | Joens | 709/242 |
| 6,130,876 A | 10/2000 | Chaudhuri | 370/228 |
| 6,130,881 A | 10/2000 | Stiller et al. | 370/238 |
| 6,134,671 A | 10/2000 | Commerford et al. | 714/4 |
| 6,148,000 A | 11/2000 | Feldman et al. | 370/397 |
| 6,154,778 A | 11/2000 | Koistinen et al. | 709/228 |
| 6,163,525 A * | 12/2000 | Bentall et al. | 370/227 |
| 6,222,653 B1 | 4/2001 | Asahi | 359/110 |
| 6,259,673 B1 | 7/2001 | Yoshihara et al. | 370/238 |
| 6,272,107 B1 | 8/2001 | Rochberger et al. | 370/216 |
| 6,275,492 B1 | 8/2001 | Zhang | 370/392 |
| 6,282,170 B1 * | 8/2001 | Bentall et al. | 370/225 |
| 6,292,464 B1 | 9/2001 | Elahmadi et al. | 370/223 |
| 6,301,244 B1 | 10/2001 | Huang et al. | 370/351 |
| 6,304,549 B1 | 10/2001 | Srinivasan et al. | 370/230 |
| 6,324,162 B1 * | 11/2001 | Chaudhuri | 370/225 |
| 6,347,078 B1 | 2/2002 | Narvaez-Guarnieri et al. | 370/230 |
| 6,370,119 B1 | 4/2002 | Basso et al. | 370/252 |
| 6,400,681 B1 | 6/2002 | Bertin et al. | 370/218 |
| 6,430,150 B1 | 8/2002 | Azuma et al. | 370/218 |
| 6,457,050 B1 | 9/2002 | Cowan et al. | 709/224 |
| 6,463,062 B1 | 10/2002 | Buyukkoc et al. | 370/395.1 |
| 6,504,845 B1 | 1/2003 | Petersen et al. | 370/412 |
| 2002/0191247 A1 * | 12/2002 | Lu et al. | 359/124 |

FOREIGN PATENT DOCUMENTS

| | | |
|---|---|---|
| EP | 0 841 824 A2 | 5/1998 |

OTHER PUBLICATIONS

H. Michael Zadikian; Steven E. Plote, John C. Adler, David Parish Autry, Ali Saleh, "Method of Providing Network Services", filed Jan. 4, 2000; U.S. Appl. No. 09/477,498.

Ali Saleh, "A Method For Path Selection In A Network", filed Jan. 4, 2000; U.S. Appl. No. 09/478,235.

Ali N. Saleh and Stevan E. Plote, "A Network Addressing Scheme For Reducing Protocol Overhead In An Optical Network", filed Sep. 2, 1999; U.S. Appl. No. 09/389,302.

Ali Saleh, H. Michael Zadikian; John C. Adler, Zareh Baghdasarian, Vahid Parsi, "Configurable Network Router", filed Jan. 15, 1999; U.S. Appl. No. 09/232,395.

Ali N. Saleh, Douglas E. Duschatko, Lane Byron Quibodeaux, "Method And Apparatus For A Rearrangeably Non-Blocking Switching Matrix", filed Jan. 4, 2000; U.S. Appl. No. 09/477,166.

H. Michael Zadikian, Ali Saleh; John C. Adler, Zareh Baghdasarian, Vahid Parsi, "A Resource Management Protocol For A Configurable Network Router", filed Jan. 4, 2000; U.S. Appl. No. 60/174,323.

Ronald Alan Russell and Michael Kevin Anthony, "A Method And Apparatus For Isolating Faults In A Switching Matrix", filed Jan. 4, 2000; U.S. Appl. No. 09/477,217.

H. Michael Zadikian, Ali Saleh, John C. Adler, Zareh Baghdasarian, Vahid Parsi, "A Method of Allocating Bandwidth in an Optical Network" (as amended), filed Jan. 15, 1999, U.S. Appl. No. 09/232,396.

The ATM Forum Technical Committee, "Interim Inter-switch Signaling Protocol (IISP) Specification v1.0", af-pnni-0026.000, Dec. 1994, pp. 1-34.

The ATM Forum Technical Committee, Private Network-Network Interface Specification Version 1.0 (PNNI 1.0), afpnni-0055.000, Mar. 1996, pp. v-xviii, pp. 19, 1-366.

The ATM Forum Technical Committee, Private Network-Network Interface Specification Version 1.0 Addendum (Soft PVC MIB), af-pnni-0066.000, Sep. 1996.

The ATM Forum Technical Committee, Addendum to PNNI V1.0 for ABR parameter negotiation, af-pnni-0075.000, Jan. 1997.pp. 2-3.

The ATM Forum Technical Committee, PNNI V1.0 Errata and PICS, af-pnni-0081.000, May 1997, pp. 2-224.

J. Moy, "OSPF Version 2", Ascend Communications, Inc., Apr. 1998.

K. Murakami, et al., "A MAPOS version 1 Extension—Switch-Switch Protocol", NTT Laboratories, Jun. 1997.

F. Baker, et al., "OSPF Version 2 Management Information Base", Cisco Systems, Nov. 1995

F. Baker, et al., "PPP Bridging Control Protocol (BCP)", IBM, Jun. 1994

E. Decker, "Definitions of Managed Objects for Bridges", Cisco Systems, Inc., Jul. 1993.

Hideki Sakauchi, et al., "A Self-Healing Network With An Economical Spare-Channel Assignment", Proceedings of the Globecom '90 IEEE Telecommunications Conference & Exhibition, vol. 1, 1991, pp. 438-443.

Baruch Awerbuch, et al., "Distributed Controls For PARIS", Proc. Annual ACM Symp. On Principles Of Distributed Computing, Aug. 22, 1999, pp. 145-159.

Sujai Hajela, "HP OEMF: Alarm Management In Telecommunications Networks", *Hewlett Packard Journal*, Oct. 1996, vol. 47, No. 5, pp. 22-30.

\* cited by examiner

METHOD FOR RESTORING A VIRTUAL PATH IN AN OPTICAL NETWORK USING 1+1 PROTECTION

CROSS-REFERENCES TO RELATED APPLICATIONS

This application is a CIP of 09/858,743 May 16, 2001 which is a CIP of 09/232,397, Jan. 15, 1999, now U.S. Pat. No. 6,856,627.

This application is also related to following commonly-assigned applications:
1. patent application Ser. No. 09/389,302, entitled "A Network Addressing Scheme For Reducing Protocol Overhead In An Optical Network," filed Sep. 2, 1999.
2. patent application Ser. No. 09/232,395, entitled "A Configurable Network Router," filed Jan. 15, 1999.
3. patent application Ser. No. 09/750,668, entitled "A Virtual Path Restoration Scheme Using Fast Dynamic Mesh Restoration in an Optical Network," filed on Dec. 29, 2000.
4. patent application Ser. No. 09/891,022, entitled "A Method for Restoring a Virtual Path in an Optical Network Using Dynamic Unicast," filed on Jun. 25, 2001.
5. patent application Ser. No. 09/876,380, entitled "A Method for Restoring a Virtual Path in an Optical Network Using 1:N Protection," filed on Jun. 7, 2001.

Above mentioned applications are assigned to Cisco Technology, Inc., the assignee of the present invention, and are hereby incorporated by reference, in their entirety and for all purposes.

BACKGROUND OF THE INVENTION

1. Field of the Invention

This invention relates to the field of information networks, and more particularly relates to a protocol for configuring routes over a network.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of lightwave communications carried over fiber-optic cables. The use of lightwave communications provides several benefits, including high bandwidth, ease of installation, and capacity for future growth.

Optical infrastructures are capable of transmission speeds in the gigabit range, which helps address the ever-increasing need for bandwidth mentioned above. Such infrastructures employ various topologies, including ring and mesh topologies. In order to provide fault protection, ring topologies normally reserve a large portion (e.g. 50% or more) of the network's available bandwidth for use in restoring failed circuits. However, ring topologies are capable of quickly restoring failed circuits. This capability is important in providing reliable service to customers, and is particularly important in telephony applications, where a failure can result in alarms, dropped calls, and, ultimately, customer dissatisfaction and lost revenue. In a similar vein, because of bandwidth demands, protocol overhead related to provisioning, restoration, and other functions should be kept to a minimum in order to make the maximum amount of bandwidth available for use by customers.

An alternative to the ring topology, the mesh topology reduces the amount of bandwidth needed for protection. The mesh topology is a point-to-point topology, with each node in the network connected to one or more other nodes. Because a circuit may be routed through various combinations of the network's nodes and over the various links which connect them, excess capacity through a given node or over a given link can serve to protect several circuits. However, the restoration of a circuit following a failure in a mesh topology can consume a relatively large amount of time.

SUMMARY

In one embodiment, the present invention restores a failed virtual path, provisioned on an active physical path, in a mesh topology optical network by providing an alternative link-and-node disjoint standby physical path protection. Each path is provisioned between the source and the destination node (the end nodes) using a different set of intermediary nodes. In case of a failure in the active physical path, the end nodes switch the virtual path to alternative standby physical path.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

Figure 1:
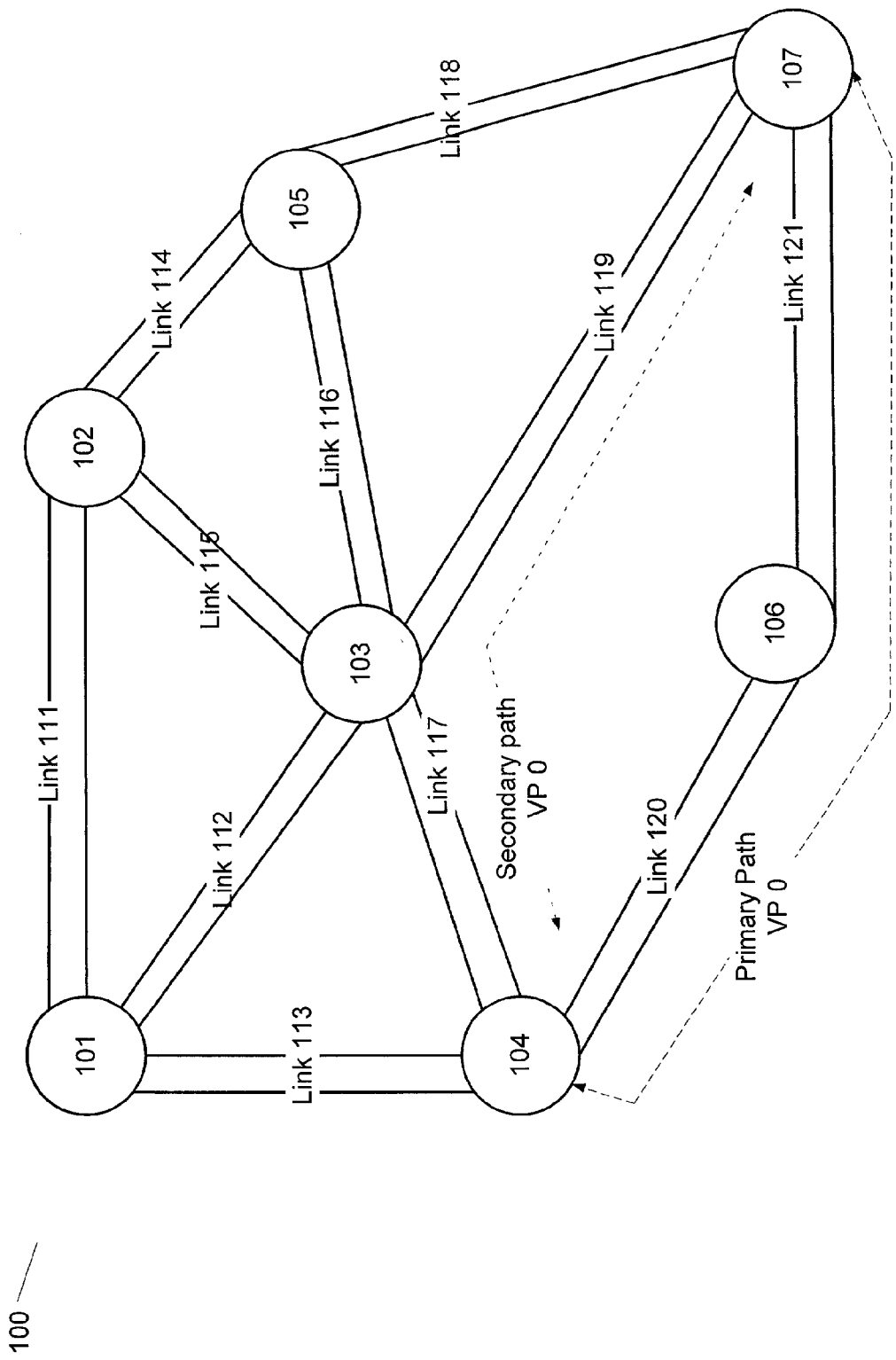
FIG. 1 illustrates an example of provisioning a virtual path using 1+1 restoration method.

The following is intended to provide a detailed description of an example of the invention and should not be taken to be limiting of the invention itself. Rather, any number of variations may fall within the scope of the invention which is defined in the claims following the description.

Provisioning of Network Nodes

A network can include multiple connected nodes. The nodes in a network can be configured in various topologies. Once a network topology has been defined, the user can configure one or more end-to-end connections that can span multiple nodes, an operation is referred to herein as provisioning. For end-to-end connection between two nodes, a physical path must be selected and configured. Each set of physical connections that are provisioned creates an end-to-end connection between the two end nodes that supports a virtual point-to-point link (referred to herein as a virtual path or VP). The resulting VP has an associated capacity and an operational state, among other attributes.

In a network, VPs may be provisioned statically or dynamically. For example, a user can identify the nodes which will comprise the virtual path and manually configure each node to support the given virtual path. The selection of nodes may be based on any number of criteria, such as Quality of Service (QoS), latency, cost, distance traveled in the network and the like. Alternatively, the VP may be provisioned dynamically using any one of a number of methods. The provisioning information may then be forwarded to all the nodes in the network to store information in each node's network topology database. Each node periodically updates this information to efficiently maintain resources and in case of path failure, effectively allocate appropriate resources needed for specific virtual path for path restoration.

The end nodes of a VP can be configured to have a master/slave relationship. The term source and destination are also used herein in referring to two such end-nodes. In such a relationship in one embodiment, the node with a numerically lower node ID typically assumes the role of the master (or source) node, while the other assumes the role of the slave (or destination) node, although the opposite arrangement is also acceptable. An intermediate node is referred to herein as tandem node. Generally, the source node assumes all provisioning responsibilities and the destination node simply waits for a message from the source node informing the destination node of the VP's new physical path. This information includes node identifications, if any, of tandem nodes of that path. In a zoned mesh network topology, if a virtual path spans over multiple zones, the border node or proxy node of each zone acts as source node for their particular zone. As will be apparent to one of skill in the art, the opposite convention or another paradigm could easily be employed.

During the provisioning, each VP is assigned a performance and restoration priority level. This priority, also referred to herein as Class of Service (CoS), determines VP's relative priority for performance within the network and restoration in the event of a failure within the network. The method of assigning CoS is described in commonly-assigned U.S. patent application Ser. No. 09/858,743, filed on May 16, 2001, entitled "A Resource Reservation Scheme for Path Restoration in an Optical Network", and is hereby incorporated by reference, in its entirety and for all purposes. In case of a VP failure at any node in the network (e.g., due to a failure of the physical path, high bit error rate or the like) the node determines how to restore the VP based on the CoS assigned to the VP. The assigned CoS defines the restoration method used by the node to restore the failed VP.

Provisioning of Virtual Path using 1+1 Protection

The 1+1 restoration method is typically assigned to mission critical data paths with higher CoS. Typically, the source node of a VP initiates the provisioning using Add Path Request packet. The an example of a method of initiating an Add Path request and the allocation of physical resources for a VP is described in commonly-assigned U.S. patent application Ser. No. 09/891,022, filed on Jun. 25, 2001, entitled "A Method For Restoring A Virtual Path In An Optical Network Using Dynamic Unicast", as previously incorporated herein.

In a 1+1 restoration method, two distinct physical paths are provisioned and assigned to a VP. Each provisioned physical path is preferably completely node and link disjoint, although the 1+1 restoration method described herein can be limited to only a section of a given path. The VP is provisioned by using two separate Add Path requests for two distinct physical paths. The provisioning of the VP is not considered successful unless two distinct physical paths are provisioned and assigned to the VP. One of the two assigned physical paths is designated as the primary path and the other physical path is designated as the secondary path. During the provisioning, each tandem node allocates specific ports at input and output links for each path. For 1+1 restoration scheme, these ports are not shared by any other VP. In case of a path failure, tandem nodes do not release these ports.

FIG. 1 illustrates an example of a VP provisioned using 1+1 restoration method. The network 100 includes seven nodes, nodes 101–107 and eleven optical links, links 111–121. Each node is connected to an adjacent node by one or more optical links. A virtual path VP 0 is provisioned in network 100. VP 0 originates at node 104 (the source node) and terminates at node 107 (the destination node). Two distinct physical paths are provisioned for VP 0. The primary path of VP 0 is provisioned over node 104, node 106 and node 107 using link 120 and link 121. The secondary path of VP 0 is provisioned over node 104, node 103 and node 107 using link 117 and link 119.

After the provisioning of VP 0, the reserved ports and the bandwidth of the secondary path at link 117 and link 119 are not used by any other VP in the network 100. The secondary path including link 117 and link 119 is dedicated to VP 0 for restoration purpose. The primary path and the secondary path stay active during the data transmission. However, one path is used as the transmission path and the other path is used as standby path in case of a failure.

Failure Detection, Propagation, and Restoration

Failure Detection and Propagation

In networks, failures are typically detected using the mechanisms provided by the underlying physical network. The failure detection mechanism in a mesh optical network is described in commonly-assigned U.S. patent application Ser. No. 09/232,397, filed Jan. 15, 1999 and entitled "A Method For Routing Information Over A Network," which is hereby incorporated by reference, in its entirety and for all purposes.

1+1 Restoration

The restoration using a 1+1 restoration scheme can be initiated either by the source node or the destination node of the VP. When the VP's active physical path fails at a tandem node, the tandem node initiates a path restoration request for the end nodes (the source node and the destination node) of the failed VP using a Restore_I request. The method of generating Restore_I requests and associated responses is described in commonly-assigned U.S. patent application Ser. No. 09/750,668, entitled "A Virtual Path Restoration Scheme Using Fast Dynamic Mesh Restoration in an Optical Network," as previously incorporated herein. The tandem node sends Restore_I request upstream and down stream for the end nodes (the source node and the destination node). The Restore_I request is transmitted in both directions because due to the path failure, one of the source node and the destination node will not receive the failure message. When a tandem node receives a Restore_I request, the tandem node forwards the Restore_I request on appropriate link to the next node. Because the physical paths are reserved for the VP, the tandem nodes do not release the resources of the VP.

When an end node (either the source node or the destination node) receives a path failure message or a Restore_I request, the end node switches the VP to the standby physical path. Each end node can switch the physical path of the VP independent of the other. The end node switches the physical path of the VP without further command packet exchange. After switching the VP to the standby physical path, the end nodes exchange a path integrity message to ensure the integrity of the VP. The end nodes also exchange a path update message to update network topology database to reflect the physical path change of the VP.

Figure 2:
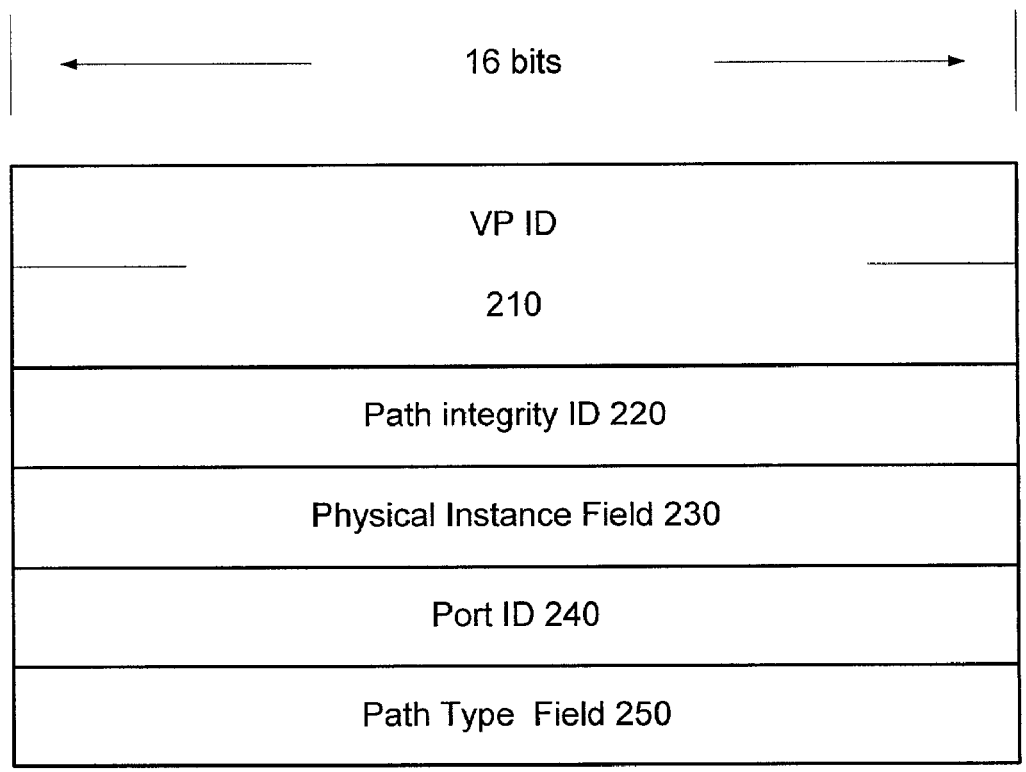
FIG. 2 illustrates an example of the path integrity message packet.

FIG. 2 illustrates an example of a path integrity message packet 200. The end node, which switches the physical path of the VP, sends the path integrity message. A positive acknowledgment to the path integrity message indicates a valid physical path for the VP. Path integrity message packet 200 includes a VP-ID 210, the 32 bit ID of the VP. It will be apparent to one of the skill in the art that, while specific lengths are described, the fields discussed here may be of any appropriate length. A path integrity ID 220 stores a 16-bit path integrity check instance. A physical instance field 230 stores a 16-bit physical instance identifier for the VP. When a new path is selected for the VP, the source node increments physical instance identifier (e.g., by 1). Due to the distributed nature of path selection and multiple failures, several physical instances of the same VP may temporarily exist in the network at any given time. However, only one instance ultimately survives. A port ID 240, the 16-bit physical port ID is used to identify the specific port that is used to transmit the path integrity message. The path type field 250 is used to identify the type of physical path (primary or secondary) that is being checked for the integrity.

Figure 3:
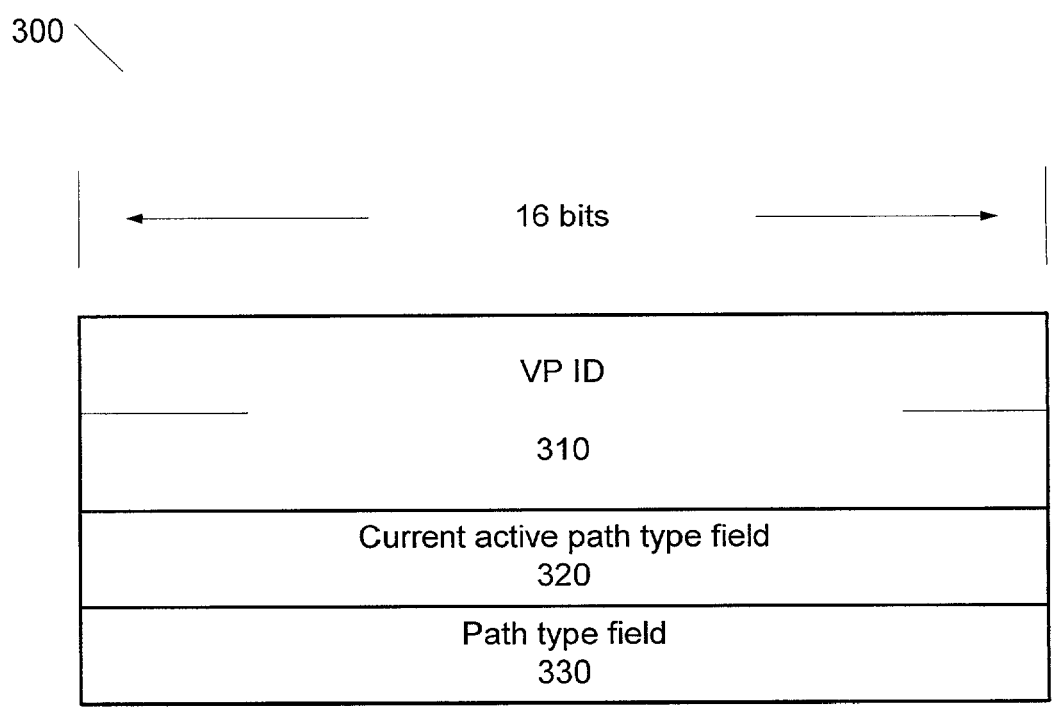
FIG. 3 illustrates an example of the path update message packet.

FIG. 3 illustrates an example of a path update message packet 300. Path update message is used to update the status of the VP in the network topology databases at each node. Path update message packet 300 includes a VP-ID 310, the VP's 32 bit ID. A current active path type field 320 is used to indicate the type of physical path (primary or secondary) that was active before the switching of the physical path. Path type field 330 indicates the type of physical path (primary or secondary) that is active after the switching of the physical path.

Figure 4:
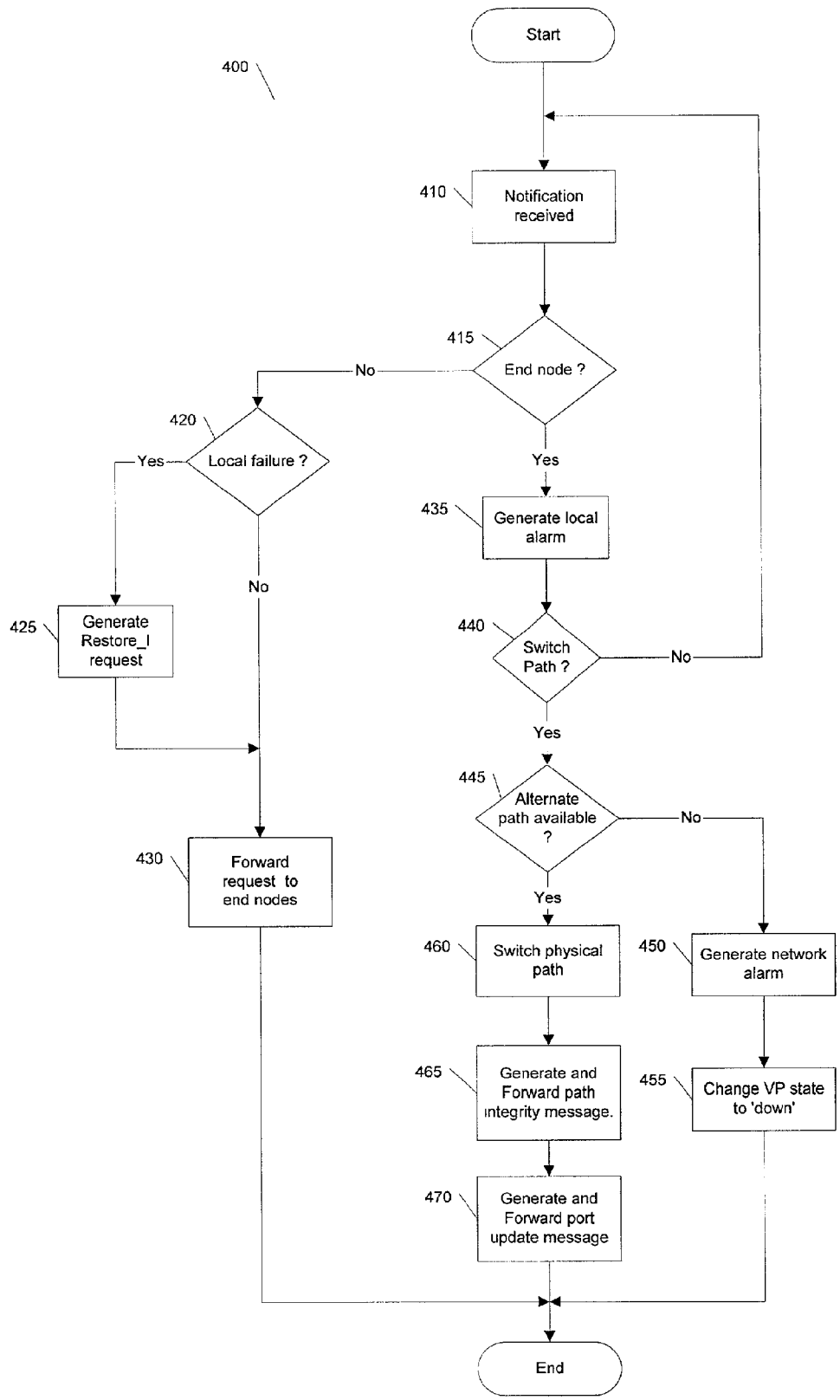
FIG. 4 is a flowchart illustrating the actions performed by a node during 1+1 restoration.

FIG. 4 is a flowchart illustrating the actions performed by a node when the node receives a notification of a VP failure. The node initially receives a path failure notification (step 410). The failure notification can be a local failure detection or a Restore_I request forwarded by another node. Upon receiving the failure notification, the node checks if the node is an end node of the VP (i.e., the source or the destination node) (step 415). If the node is not the end node of the VP (i.e., the node is a tandem node), the node checks if the path failure is a local failure (step 420). If the failure is not a local failure (i.e., the node receives a Restoer_I request from a remote node), the node forwards the failure notification upstream and downstream (step 430). The failure notifications are forwarded in both directions so the end node (either the source node or the destination node) can switch VP to the secondary path. If the failure is a local failure, the node generates a Restore_I request for the end nodes (step 425). The node forwards the request upstream and downstream for the end nodes (step 430). The resources of the VP at the tandem nodes are not released.

If the failure notification is received by the end node (the source node or the destination node) of the VP, the end node generates a local alarm (step 435). The failures can be major (e.g., failure of a link and the like) or minor (e.g., high bit rate error and the like). Generally, not every failure requires physical path switching. The node determines if the failure requires switching the physical path of the VP (step 440). If the failure does not require switching the physical path, the node needs not take any further action. If the failure requires switching the physical path, the node determines if the alternate physical path is available (step 445). If the alternate physical path is not available (i.e., due to a previous failure that has not been fixed), the node generates a major network alarm (step 450). The node changes the state of the VP to down (step 455).

If the alternate physical path is available, the node proceeds to switch the physical path (step 460). After switching the VP to the alternate physical path, the node sends a path integrity message to check the validity of the VP (step 465). The node also sends a port update message on the VP to update the active ports information in the network (step 470). After the switching of the physical path, the VP continues to use the alternate physical path until a failure occurs in the alternate physical path. In case of a failure on the alternate physical path, similar process is followed to switch the VP to the previous physical path provided that the previous physical path is restored.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for restoring a virtual path in an optical network, the method comprising:
    identifying a first plurality of nodes with resources, wherein said optical network comprises a plurality of nodes, each one of said nodes is coupled to at least one another of said nodes in a mesh topology and said nodes with resources are ones of said nodes having a resource necessary to support said virtual path;
    provisioning a primary physical path for said virtual path, said primary physical path comprising ones of said first plurality of nodes with resources;
    identifying a second plurality of nodes with resources, wherein said nodes with resources are ones of said nodes having a resource necessary to support said virtual path;
    provisioning a secondary physical path for said virtual path, said secondary physical
    path comprising ones of said second plurality of nodes with resources; maintaining said primary physical path as a transmission path and said secondary
    physical path as a standby path;
    detecting a failure of said primary physical path after said provisioning said primary physical path and said provisioning said secondary physical path; and in response to said failure, restoring said virtual path using said secondary physical path.

2. The method of claim 1, wherein said restoring is done by switching said virtual path to said secondary physical path.

3. The method of claim 2, wherein said detecting said failure is done by receiving a failure message packet.

4. The method of claim 3, wherein
    said primary physical path is provisioned between a first node and a second node of said nodes, said secondary physical path is provisioned between said first and said second nodes, said primary physical path between said first node and said second node comprises a first plurality of intermediate nodes, and said secondary physical path between said first node and said second node comprises a second plurality of intermediate nodes, wherein said first and said second plurality of intermediate nodes are ones of said nodes.

5. The method of claim 4, wherein said primary physical path and said secondary physical path are link and intermediate node disjoint.

6. The method of claim 4, wherein said virtual path is provisioned on one of said primary physical path and said secondary physical path, and each one of said nodes is coupled to at least one another of said nodes by a plurality of optical links in a mesh topology.

7. The method of claim 6, wherein said restoring of said virtual path is completed in less than 50 milliseconds.

8. The method of claim 7, wherein one of said intermediate nodes receives said failure message.

9. The method of claim 8, further comprising:

if said failure is a local failure, generating a path restoration request for said first node and said second node, and forwarding said path restoration request to said first node and said second node.

10. The method of claim 8, further comprising: if said failure is not a local failure, forwarding said failure message to said first node and said second node.

11. The method of claim 7, wherein one of said first node and said second node receives said failure message.

12. The method of claim 11, further comprising: generating a local alarm, and determining if said failure requires physical path switching.

13. The method of claim 12, further comprising:

if said failure requires physical path switching, determining if said secondary physical path is available.

14. The method of claim 13, further comprising:

if said secondary physical path is available, switching said virtual path to said secondary physical path, forwarding a path integrity message on said virtual path, and forwarding a port update message on said virtual path.

15. The method of claim 13, further comprising:

if said secondary physical path is not available, generating a network alarm, and changing a state of said virtual path to 'down'.

16. The method of claim 1, wherein said maintaining said primary physical path and said secondary physical path comprises avoiding a use of said second plurality of nodes with resources for virtual paths other than said virtual path in said optical network.

17. A network element comprising:

a communications port configured to communicate with an optical network; and a processor coupled to said communications port, configured to control the communication port, and configured to:

identify a first plurality of nodes with resources in said optical network, wherein said optical network comprises a plurality of nodes, each one of said nodes is coupled to at least one another of said nodes in a mesh topology and said nodes with resources are ones of said nodes having a resource necessary to support a virtual path;

provision a primary physical path for said virtual path, said primary physical path comprising ones of said first plurality of nodes with resources;

identify a second plurality of nodes with resources, wherein said nodes with resources are ones of said nodes having a resource necessary to support said virtual path;

provision a secondary physical path for said virtual path, said secondary physical path comprising ones of said second plurality of nodes with resources; maintain said primary physical path as a transmission path, and said secondary physical path as a standby path;

detect a failure of said primary physical path after provisioning said primary physical path and provisioning said secondary physical path; and in response to said failure, restore said virtual path using said secondary physical path.

18. The network element of claim 17, wherein said processor is further configured to:

switch said virtual path to said secondary physical path.

19. The network element of claim 17, wherein said processor is further configured to: receive a failure message packet to detect said failure.

20. The network element of claim 19, wherein said primary physical path is provisioned between a first node and a second node of said nodes, said secondary physical path is provisioned between said first and said second nodes, said primary physical path between said first node and said second node comprises a first plurality of intermediate nodes, and said secondary physical path between said first node and said second node comprises a second plurality of intermediate nodes, wherein said first and said second plurality of intermediate nodes are ones of said nodes.

21. The network element of claim 20, wherein said primary physical path and said secondary physical path are link and intermediate node element disjoint.

22. The network element of claim 20, wherein said virtual path is provisioned on one of said primary physical path and said secondary physical path, and each one of said nodes is coupled to at least one another of said nodes by a plurality of optical links in a mesh topology.

23. The network element of claim 20, wherein said processor is further configured to restore said virtual path in less than 50 milliseconds.

24. The network element of claim 23, wherein said processor is configured as said intermediate node in said network.

25. The network element of claim 24, wherein said processor is configured as one of said first node and said second node in said network.

26. The network element of claim 25, wherein said processor is further configured to:

generate a local alarm, and determine if said failure requires physical path switching.

27. The network element of claim 26, wherein said processor is further configured to:

if said failure requires physical path switching, determine if said secondary physical path is available.

28. The network element of claim 27, wherein said processor is further configured to:

if said secondary physical path is available,
switch said virtual path to said secondary physical path,
forward a path integrity message on said virtual path, and
forward a port update message on said virtual path.

29. The network element of claim 27, wherein said processor is further configured to:
if said secondary physical path is not available,
generate a network alarm, and
change a state of said virtual path to 'down'.

30. The network element of claim 24, wherein said processor is further configured to:
if said failure is a local failure,
generate a path restoration request for said first node and said second node, and
forward said path restoration request to said first node and said second node.

31. The network element of claim 24, wherein said processor is further configured to:
if said failure is not a local failure,
forward said failure message to said first node and said second node.

32. The network element of claim 17, wherein said processor is configured to:
avoid a use of said second plurality of nodes with resources for virtual paths other than said virtual path in said optical network.

33. A computer system for restoring a virtual path in an optical network, said computer system comprising:
means for identifying a first plurality of nodes with resources, wherein said optical network comprises a plurality of nodes, each one of said nodes is coupled to at least one another of said nodes in a mesh topology and said nodes with resources are ones of said nodes having a resource necessary to support said virtual path;
means for provisioning a primary physical path for said virtual path, said primary physical path comprising ones of said first plurality of nodes with resources;
means for identifying a second plurality of nodes with resources, wherein said nodes with resources are ones of said nodes having a resource necessary to support said virtual path;
means for provisioning a secondary physical path for said virtual path, said secondary physical path comprising ones of said second plurality of nodes with resources;
means for maintaining said primary physical path as a transmission path and said secondary physical path as a standby path;
means for detecting a failure of said primary physical path, wherein said failure occurs after said provisioning said primary physical path and said provisioning said secondary physical path: and
means for restoring, in response to said failure, said virtual path using said secondary physical path.

34. The computer system of claim 33, further comprising:
means for switching said virtual path to said secondary physical.

35. The computer system of claim 34, further comprising: means for receiving a failure message packet.

36. The computer system of claim 35, wherein
said primary physical path is provisioned between a first node and a second node of said nodes,
said secondary physical path is provisioned between said first and said second nodes,
said primary physical path between said first node and said second node comprises a first plurality of intermediate nodes, and
said secondary physical path between said first node and said second node comprises a second plurality of intermediate nodes, wherein said first and said second plurality of intermediate nodes are ones of said nodes.

37. The computer system of claim 36, wherein said primary physical path and said secondary physical path are link and intermediate node disjoint.

38. The computer system of claim 36, wherein
said virtual path is provisioned on one of said primary physical path and said secondary physical path, and
each one of said nodes is coupled to at least one another of said nodes by a plurality of optical links in a mesh topology.

39. The computer system of claim 38, wherein said restoring of said virtual path is completed in less than 50 milliseconds.

40. The computer system of claim 39, wherein one of said intermediate nodes receives said failure message.

41. The computer system of claim 40, further comprising:
if said failure is a local failure,
means for generating a path restoration request for said first node and said second node, and
means for forwarding said path restoration request to said first node and said second node.

42. The computer system of claim 40, further comprising:
if said failure is not a local failure,
means for forwarding said failure message to said first node and said second node.

43. The computer system of claim 39, wherein one of said first node and said second node receives said failure message.

44. The computer system of claim 43, further comprising: means for generating a local alarm, and means for determining if said failure requires physical path switching.

45. The computer system of claim 44, further comprising: if said failure requires physical path switching,
means for determining if said secondary physical path is available.

46. The computer system of claim 45, further comprising:
if said secondary physical path is available,
means for switching said virtual path to said secondary physical path,
means for forwarding a path integrity message on said virtual path, and means for forwarding a port update message on said virtual path.

47. The computer system of claim 45, further comprising:
if said secondary physical path is not available, means for generating a network alarm, and
means for changing a state of said virtual path to 'down'.

48. The computer system of claim 33, wherein
said means for maintaining said primary physical path and said secondary physical path comprises means for avoiding a use of said second plurality of nodes with resources for virtual paths other than said virtual path in said optical network.

49. A computer program product for restoring a virtual path in an optical network, encoded in computer readable media, said computer program product comprising:
a first set of instructions executable on a computer system, configured to identify a first plurality of nodes with resources, wherein said optical network comprises a plurality of nodes, each one of said nodes is coupled to at least one another of said nodes in a mesh topology and said nodes with resources are ones of said nodes having a resource necessary to support said virtual path;
a second set of instructions executable on said computer system, configured to provision a primary physical path for said virtual path, said primary physical path comprising ones of said first plurality of nodes with resources;
a third set of instructions executable on said computer system, configured to identify a second plurality of nodes with resources, wherein said nodes with resources are ones of said nodes having a resource necessary to support said virtual path;
a fourth set of instructions executable on said computer system, configured to provision a secondary physical path for said virtual path, said secondary physical path comprising ones of said second plurality of nodes with resources;
a fifth set of instructions executable on said computer system, configured to maintain said primary physical path as a transmission path, and said secondary physical path as a standby path;
a sixth set of instructions executable on said computer system, configured to detect a failure of said primary physical path that occurs after said second set of instructions provisions said primary physical path and said fourth set of instructions provisions said secondary physical path: and
a seventh set of instructions executable on said computer system, configured to restore, in response to said failure, said virtual path using said secondary physical path.

50. The computer program product of claim 49, wherein said seventh set of instructions comprises:
instructions, executable on said computer system, configured to switch said virtual path to
said secondary physical path.

51. The computer program product of claim 49, wherein said restoring of said virtual path is completed in less than 50 milliseconds.

52. The computer program product of claim 51, wherein
said primary physical path is provisioned between a first node and a second node of said nodes,
said secondary physical path is provisioned between said first and said second nodes,
said primary physical path between said first node and said second node comprises a first plurality of intermediate nodes, and
said secondary physical path between said first node and said second node comprises a second plurality of intermediate nodes, wherein said first and said second plurality of intermediate nodes are ones of said nodes.

53. The computer program product of claim 52, wherein said primary physical path and said secondary physical path are link and intermediate node disjoint.

54. The computer program product of claim 52, wherein
said virtual path is provisioned on one of said primary physical path and said secondary physical path, and
each one of said nodes is coupled to at least one another of said nodes by a plurality of optical links in a mesh topology.

55. The computer program product of claim 54, wherein said computer system is configured as said intermediate node.

56. The computer program product of claim 55, further comprising: if said failure is a local failure, an eighth set of instructions, executable on said computer system, configured to generate a path restoration request for said first node and said second node, and
a ninth set of instructions, executable on said computer system, configured to forward said path restoration request to said first node and said second node.

57. The computer program product of claim 55, further comprising:
if said failure is not a local failure,
a tenth set of instructions executable on said computer system, configured to forward said failure message to said first node and said second node.

58. The computer program product of claim 54, wherein said computer system is configured as one of said first node and said second node.

59. The computer program product of claim 58, further comprising:
an eleventh set of instruction, executable on said computer system, configured to generate a local alarm, and
a twelfth set of instructions, executable on said computer system, configured to determine if said failure requires physical path switching.

60. The computer program product of claim 59, further comprising:
if said failure requires physical path switching,
a thirteenth set of instructions, executable on said computer system, configured to determine if said secondary physical path is available.

61. The computer program product of claim 60, further comprising: if said secondary physical path is available,
a fourteenth set of instructions, executable on said computer system, configured to switch said virtual path to said secondary physical path,
a fifteenth set of instructions executable on said computer system, configured to forward a path integrity message on said virtual path, and
a sixteenth set of instructions, executable on said computer system, configured to forward a port update message on said virtual path.

62. The computer program product of claim 60, further comprising:
if said secondary physical path is not available,
a seventeenth set of instructions, executable on said computer system, configured to generate a network alarm, and
an eighteenth set of instructions, executable on said computer system, configured to change a state of said virtual path to 'down'.

63. The computer program product of claim 49, wherein said fifth set of instructions is configured to
avoid a use of said second plurality of nodes with resources for virtual paths other than said virtual path in said optical network.

64. An optical network comprising:
a plurality of links;
a plurality of nodes, each one of said plurality of nodes is coupled to at least one other of said plurality of nodes by at least one of said plurality of links in a mesh topology, wherein said optical network is configured to,
identify a first plurality of nodes with resources, said nodes with resources are ones of said nodes having a resource necessary to support a virtual path,
provision a primary physical path for said virtual path, said primary physical path comprising ones of said first plurality of nodes with resources, identify a second plurality of nodes with resources, wherein said nodes with resources are ones of said nodes having a resource necessary to support said virtual path, provision a secondary physical path for said virtual path, said secondary physical path comprising ones of said second plurality of nodes with resources, maintain said primary physical path as a transmission path and said secondary physical path as a standby path, detect a failure of said primary physical path after said primary physical path and said secondary physical path have been provisioned, and in response to said failure, restore said virtual path using said secondary physical path.

65. The optical network of claim 64, further configured to switch said virtual path to said secondary physical path.

66. The optical network of claim 65, wherein said detecting said failure is done by receiving a failure message packet.

67. The optical network of claim 66, wherein said primary physical path is provisioned between a first node and a second node of said nodes, said secondary physical path is provisioned between said first and said second nodes, said primary physical path between said first node and said second node comprises a first plurality of intermediate nodes, and said secondary physical path between said first node and said second node comprises a second plurality of intermediate nodes, wherein said first and said second plurality of intermediate nodes are ones of said nodes.

68. The optical network of claim 67, wherein said primary physical path and said secondary physical path are link and intermediate node disjoint.

69. The optical network of claim 67, wherein said virtual path is provisioned on one of said primary physical path and said secondary physical path, and each one of said nodes is coupled to at least one another of said nodes by a plurality of optical links in a mesh topology.

70. The optical network of claim 69, wherein said restoring of said virtual path is completed in less than 50 milliseconds.

71. The optical network of claim 70, wherein one of said intermediate nodes receives said failure message.

72. The optical network of claim 71, further configured to if said failure is a local failure, generate a path restoration request for said first node and said second node, and forward said path restoration request to said first node and said second node.

73. The optical network of claim 71, further configured to if said failure is not a local failure, forward said failure message to said first node and said second node.

74. The optical network of claim 70, wherein one of said first node and said second node receives said failure message.

75. The optical network of claim 74, further configured to generate a local alarm, and determine if said failure requires physical path switching.

76. The optical network of claim 75, further configured to if said failure requires physical path switching, determine if said secondary physical path is available.

77. The optical network of claim 76, further configured to if said secondary physical path is available, switch said virtual path to said secondary physical path, forward a path integrity message on said virtual path, and forward a port update message on said virtual path.

78. The optical network of claim 76, further configured to if said secondary physical path is not available, generate a network alarm, and change a state of said virtual path to 'down'.

79. The optical network of claim 64, configured to:

avoid a use of said second plurality of nodes with resources for virtual paths other than said virtual path in said optical network.

* * * * *